United States Patent [19]
Plank

[11] 3,853,810
[45] Dec. 10, 1974

[54] NICKEL SALTS OF ARYLSULFONIC ACIDS AS ULTRAVIOLET STABILIZERS FOR LIGHT SENSITIVE POLYMERS

[75] Inventor: Don A. Plank, Baytown, Tex.

[73] Assignee: Exxon Research & Engineering Company, Linden, N.J.

[22] Filed: Oct. 16, 1972

[21] Appl. No.: 298,060

[52] U.S. Cl............... 260/45.75 N, 8/42, 8/89, 8/173, 8/180, 106/194, 260/45.7 P, 260/45.85 S, 260/45.9, 260/45.95 H, 260/45.95 R

[51] Int. Cl............... C08f 45/62, C08g 51/62

[58] Field of Search.. 260/45.95 H, 45.95 R, 45.85 S, 260/45.7 P, 45.9, 45.75 N; 106/194; 8/42 D, 89, 173, 180

[56] References Cited
UNITED STATES PATENTS

| | | | |
|---|---|---|---|
| 3,072,601 | 1/1963 | Breslow | 260/45.75 |
| 3,167,526 | 1/1965 | Nicholson | 260/45.75 |
| 3,189,630 | 6/1965 | Smutney | 260/45.75 |
| 3,415,875 | 12/1968 | Luethi et al. | 260/45.75 |
| 3,556,709 | 1/1971 | Jirou et al. | 8/42 |

FOREIGN PATENTS OR APPLICATIONS 43-7706  3/1968  Japan

OTHER PUBLICATIONS

Chemical Abstracts – Vol. 68, pp. 3995 and 3996 of Abstract citation, 40919s.

*Primary Examiner*—V. P. Hoke
*Attorney, Agent, or Firm*—D. A. Roth

[57] ABSTRACT

Compositions having outstanding resistance to ultraviolet initiated degradation are obtained by blending a major quantity of an ultraviolet-sensitive material such as a polymer with a small quantity of a nickel salt of an arylsulfonic acid. A material for use in the inventive composition is polypropylene.

13 Claims, No Drawings

NICKEL SALTS OF ARYLSULFONIC ACIDS AS ULTRAVIOLET STABILIZERS FOR LIGHT SENSITIVE POLYMERS

BACKGROUND OF THE INVENTION

Many materials, especially hydrocarbons and most particularly hydrocarbon polymers are susceptible to oxidative and photo-initiated degradation. Conventionally, this is retarded by utilizing two classes of additives which are termed antioxidants and UV stabilizers, respectively. Polymers made from olefins are especially susceptible to oxidative degradation.

Low density polyethylene usually requires only a small amount of antioxidant and polystyrene likewise requires only a minimal amount of antioxidants. Nevertheless, high density polyethylene, high impact polystyrene, ABS terpolymers and polypropylene are included among commercial polymers which are exceedingly sensitive to oxidative degradation, both while being processed and upon exposure to the environment.

It is generally accepted that polymer degradation by free radicals in the presence of oxygen involves chain scission followed by termination. Chain scission results in loss of molecular weight, increased melt flow, a decrease of polymeric toughness some cross-linking and an eventual disintegration to powder.

Cross-linking results in an increase of molecular weight, embrittlement and a decrease in melt flow.

It is apparent that many polymers will have to be exposed to heat, both during processing and during their life in a particular use, and exposure to oxygen will also be unavoidable in these applications. Therefore, the adverse effect of degradation must be minimized in order to obtain a reasonable service life for the polymer material.

A great many compounds for stabilizing polyolefins have been developed with the object of retarding, inhibiting or otherwise modifying the degradation process. People disagree as to exactly how these stabilizers function.

There is general agreement that one class of materials prevents adverse degradation by oxidation by acting by a free radical scavenging mechanism. Examples of these are hindered phenols and amines.

Another type acts as peroxide decomposers which actually decompose the peroxides formed on the polymer backbone. Classes of compounds which appear to work in this manner are thioesters and phosphites.

Thioesters and alkyl aryl phosphates are generally used in combination with the hindered phenols and appear to interact with them to increase the overall stability in a synergistic manner although their primary function is apparently as peroxide decomposers.

Many polymers including polyolefins (including polystyrenes), polyesters, ABS, acrylics, polycarbonates and other thermoplastics experience attack from ultraviolet radiation. This occurs primarily with outdoor exposure where visible light from the 290–400 m. micron range is strong enough to break chemical bonds in such polymers.

Polypropylene, for instance, is exceptionally sensitive to ultraviolet radiation. This type of attack is accelerated by concomitant oxidative degradation. Thus, polymers of this type in outdoor use will always have a stabilizer system which contains a UV stabilizer and an oxidative stabilizer.

Generally the mechanism of oxidative degradation gives rise to carbonyl groups on the polymer chain which results in chain-scission radical formation. Carbonyl groups are susceptible to UV radiation which causes chain scission and which leads to reduced molecular weights.

A conventional method of retarding adverse effects of UV radiation is to incorporate in the polymer compounds that will absorb irradiation and convert it into a harmless form. Such compounds have high absorption coefficients in the UV portion of the spectrum but minimal absorption in the visible range so that no color is imparted to the polymer. Typical UV absorbers are benzophenones, benzotriazoles and acrylonitriles.

Another technique for deactivating the adverse effects of UV radiation involves quenching or deactivating the carbonyl groups on the polymer chain which have been activated by the UV radiation. These are quenched primarily by nickel complexes and the process involves the transfer of energy, which is not destructive to the polymer.

Nickel complexes of various compounds such as thiobisphenols, carboxylates, amines, etc., all have activity as UV stabilizers.

Nickel compounds have presented practical difficulties in use because they tend to depreciate the heat stabilizing effectiveness of heat stabilizers in the polymer blend. In addition, they tend to be highly colored and thus introduce a strong color into the polymer composition which is very disadvantageous for many end uses. Moreover, the color imparted to the polyolefin often becomes intensified in the presence of other UV absorbers, stabilizers and antioxidants.

A great number of highly colored organo nickel compounds have been proposed, these include salts of phenols, acetylacetone, carboxylic acids, polyamines, arylmercaptans, glyoximes, alpha amino carboxylic acids, bis-alkylphenolsulfides, bis-alkylphenolsulfoxides, hydroxyethyl thioethers. Quite a few others of no particular relevance to this particular application are disclosed in detail, on page 2 of British Patent 1,165,214.

SUMMARY OF THE INVENTION

Novel UV stabilized compositions particularly polymers containing nickel salts of arylsulfonic acids exhibit excellent resistance to UV radiation as well as compatibility with other conventional additives and additionally and surprisingly impart little or no color to the composition.

RELATED APPLICATIONS

There are no related applications by this inventor on the subject matter of the invention.

PREFERRED EMBODIMENTS OF THE INVENTION

It has now been discovered and forms a unique feature of this invention that novel unobvious UV stabilized polymer compositions can be made containing minor portions of nickel salts of arylsulfonates. The new blend is highly resistant to melt index increase under exposure to light, has little, if any, color, in contrast to previously used nickel compounds, and also improved retention of color and other important properties of the base polymer.

The new composition has high resistance to light-induced deterioration of the polymer component, and in combination with other heat and/or light stabilizers has improved resistance to light and to both heat and light-induced deterioration for relatively long periods of time as evidenced by certain tests to be described later herein.

Although the nickel compounds of the art provide excellent protection, they, as indicated above, suffer from a major disadvantage of being highly colored. Furthermore, they also tend to degrade at high extrusion temperatures. Thus, their use is limited to those applications where color is not a critical feature.

Moreover, except for primarily the nickel carboxylates, the compounds are expensive because the organic moieties used are generally exotic, thus causing relatively high prices.

Although the nickel salts of carboxylic acids are green, they were investigated and used because they exhibit the important feature of being inexpensive. The color problem with nickel carboxylic acid salts is further complicated when used in extrusion grade plastics by the fact that most of the nickel carboxylic acid salts break down when extruded. The breakdown product is a nickel carbonate which ultimately forms nickel oxide. This is a gray material and tends to make the color problem even more difficult.

It has been found and forms the major feature of this invention that nickel salts of arylsulfonic acids are particularly thermally stable. Thus, they will not degrade under extruder conditions and the graying problem is eliminated.

Furthermore, there are a great many suitable long chain alkyl derivatives of arylsulfonic acids as well as short ones which are commercially available. It is necessary that the sulfonic acids be substituted with hydrocarbon groups in order to have adequate solubility in a high molecular weight polymer matrix.

An additional bonus to be reaped with the use of these additive salts is that the nickel arylsulfonic acids salts can exist in two forms, i.e. a hydrated form and an anhydrous form. The hydrated form has a green color while the anhydrous form is pale yellow.

Thus, upon extrusion the temperatures are high enough to convert the salt to the pale yellow form which imparts a practically imperceptible color to the polymer blend.

Furthermore, all of these color advantages are obtained with no loss in effectiveness compared to the commercially available UV stabilizers and as compared to the nickel salts of carboxylic acids.

It is also an advantage of the invention that the polymer compositions of the invention have excellent dye acceptability. This is a highly desired attribute for polyolefins.

In general, the aryl portion of the molecule will have from 1 to 10, preferably 1 to 5 and most preferably 1-2, aryl rings either directly linked to form condensed or fused rings or linked in such a manner as to preserve the individuality of each ring, i.e. biphenyl, bisphenyl, etc. In its most preferable aspect, the aryl portion is phenyl.

The aryl portion of the molecule, where necessary, is accompanied by an organic moiety sufficient to impart adequate solubility of the nickel salt into the particular matrix, usually polymer. If the aryl portion is phenyl, in general, the hydrocarbon portion will comprise 1 to 10, preferably 1 to 5, aliphatic substituents, i.e. alkyl, alkenyl, cycloalkyl, cycloalkenyl, etc., and will have a total of about from 1 to 100 carbon atoms, preferably 5 to 50, and most preferably 10 to 20 carbon atoms. The aryl and aliphatic portions can be substituted with other components so long as these do not interfere with UV and color properties of the nickel sulfonic acid salts and as long as they do not adversely affect the solubility of the salt in the polymer matrix.

In the art the sulfonic acid salts are usually classified as water-soluble or oil-soluble. Both types can be used for the purposes of the invention so long as they conform to the criteria enunciated above and herein.

To avoid any ambiguity, as used herein, the term oil-soluble refers to metal salts of hydrocarbyl, preferably alkaryl, sulfonic acids having an average equivalent weight of 300 and above, preferably in the range of 300 to 780. The term water-soluble refers to metal salts of hydrocarbyl sulfonic acids having an average equivalent weight of below 300. It should be noted that the sulfonic acids used to prepare the oil-soluble and water-soluble metal sulfonates will have individual component sulfonic acids with an equivalent weight well above and below the average equivalent weight.

It is customary in the sulfonate art to describe the sulfonate by the type of hydrocarbon used to prepare the sulfonic acid. Because of this the hydrocarbons used to prepare both the metal sulfonates will be described in detail.

Suitable sulfonates for use in the invention include those prepared from sulfonic acids which are prepared from alkaryls, and from diphenylalkanes. Preferably the alkaryls are monoalkylaryls and more preferably are monoalkylbenzenes. An example of a suitable alkaryl is dodecylbenzene. Typically, this material is prepared by preparing a propylene tetramer and then alkylating benzene with the prophylene tetramer. The resulting product contains alkyl groups having from 9 to 15 carbon atoms, with a predominance of $C_{12}$ alkyl groups. The term dodecylbenzene is so well understood in the sulfonate art that further description is not necessary.

Another suitable sulfonate is prepared from a sulfonic acid which is prepared from an alkyl benzene prepared by alkylating benzene with a substantially straight-chain $C_8$–$C_{18}$ 1-olefin or an analogous chlorinated hydrocarbon. The preparation of a particularly suitable straight chain alkyl benzene is described in U.S. Pat. No. 3,316,294, which patent is made a part of this disclosure.

Briefly, the process of U.S. Pat. No. 3,316,294 comprises the following steps, broadly stated:

a. Separating a fraction of substantially straight-chain $C_8$–$C_{18}$ hydrocarbons from a petroleum distillate substantially free of olefins and containing said straight-chain hydrocarbons together with non-straight chain hydrocarbons, b. Chlorinating said fraction to the extent whereby between about 10 and about 35 mole percent of the straight-chain hydrocarbons present are substantially only monochlorinated, c. Alkylating an aromatic compound (e.g. and preferably, benzene) with the chlorination product of step (b) in the presence of an alkylation catalyst, and d. Distilling the alkylate to obtain the desired detergent alkylate fraction.

Still another suitable sulfonate is prepared from a sulfonic acid which is prepared from a diphenylalkane fraction, which is a by-product of the alkylbenzene prepared in accordance with the procedure of U.S. Pat. No. 3,316,294. The sulfonic acid prepared from diphenylalkane is represented by the following formula:

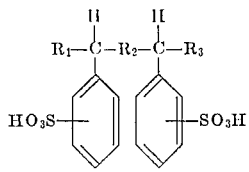

wherein
R₁ and R₃ are alkyl groups containing from 1 to 15 carbon atoms and
R2 is an alkyl group containing from 1 to 14 carbon atoms, with the sum of $R_1$, $R_2$ and $R_3$ being an integer in the range of 6 to 16.

Additionally, sulfonates for use in the invention include both those prepared from mahogany sulfonic acids and synthetic alkaryl sulfonic acids, preferably the latter. The mahogany sulfonic acids are a complex mixture of aromatic and alicyclic sulfonic acids produced in the conventional sulfuric acid refining of lubricating oil distillates. The industrial production of mahogany sulfonic acid is well known in the art and such products are readily available commercial items.

A suitable synthetic alkaryl sulfonic acid for preparing the oil-soluble metal alkaryl sulfonates is prepared from postdodecylbenzene which is well known in the sulfonate art. Postdodecylbenzene is a bottoms product from the manufacture of dodecylbenzene, and, preferably, has a molecular weight in the range of from about 370 to about 700. (A sulfonic acid prepared from dodecylbenzene having an average molecular weight of about 700 would have an average equivalent weight of about 780). It consists of monoalkylbenzenes and dialkylbenzenes, the alkyl groups being branched-chain, in the approximate mole ratio of 2:3.

Another suitable synthetic alkaryl sulfonic acid for preparing the oil-soluble metal alkaryl sulfonates is prepared from the bottoms product obtained in the production of water-soluble detergent alkylate in accordance with the process of U.S. Pat. No. 3,316,294. The bottoms product is referred to as "NAB Bottoms" and is a complex mixture of monoalkylbenzenes, dialkylbenzenes, alkylated tetrahydronaphthalenes, and diphenylalkanes. Stripping removes the major portion of the diphenylalkanes, so that the stripped bottoms is a mixture of monoalkylbenzenes, dialkylbenzenes and alkylated tetrahydronaphthalenes, with the alkylated tetrahydronaphthalenes being only a minor amount (e.g. from about 15 to about 30 weight percent).

Still another suitable alkaryl sulfonic acid for preparing the oil-soluble metal alkaryl sulfonates is prepared from the product obtained by disproportionating an n-alkyl benzene in the presence of a Friedel-Crafts catalyst. This product is predominantly di-n-alkylbenzenes in which the alkyl groups are predominantly oriented in the para position. Preferably, the average molecular weight of this class of alkylate is between about 400 and 425.

Yet another suitable alkaryl sulfonic acid for preparing the oil-soluble metal alkaryl sulfonates is prepared from a material which is referred to as "dimer alkylate." In contrast to the "NAB Bottoms," described hereinbefore, "dimer alkylate" is predominantly monoalkyl aromatic, with the alkyl group being branched and, preferably highly branched. Furthermore, the alkyl group contains at least 17 carbon atoms, preferably more than 17 carbon atoms. Preferably, the aromatic moiety is phenyl. The "dimer alkylate" has the following properties:

| Property | Suitable | More suitable | Preferred |
|---|---|---|---|
| Percent monoalkyl content* | Above 50 | Above 70 | Above 90 |
| Molecular weight (average) | Above 320 | Above 350 | 375–478 |
| Boiling range, °F., at 20 mm. Hg. | Above 325 | Above 375 | Above 400 |
| Sulfonation yield lb. RSO₃H/lb. alkylate | Above 0.75 | Above 0.85 | Above 0.95 |

*This is based on mole percent of total aromatic constituents.

A particularly suitable method of preparing "dimer alkylate" comprises the following steps:
a. dimerization of a suitable feedstock, such as cat poly gasoline,
b. alkylation of an aromatic hydrocarbon, preferably benzene, with the dimer formed in step (a).

Preferably, the dimerization step uses a Friedel-Crafts alkylation sludge as the catalyst. This process and the "dimer alkylate" product are described in U.S. Pat. No. 3,410,925, said patent being made a part of this disclosure.

Knowing the type of hydrocarbons used to prepare the metal sulfonates of our invention, any person skilled in this art can readily prepare a sulfonic acid from the hydrocarbon and then convert the sulfonic acid to the desired metal sulfonate. An exemplary method for preparing the metal salts of the sulfonic acids described herein can be found described in U.S. Pat. No. 3,277,002.

Usually, the oil-soluble sulfonic acids contain a substantial amount of free oil. While this is not harmful when these acids are to be converted to lube oil additives, it is not desirable in a fiber-forming polyolefin composition. For this reason, it is desirable to de-oil the commercially available oil-soluble sulfonic acid or sulfonate if the content of free oil exceeds about 10%. This can be achieved by washing the sulfonate with a polar solvent to provide a sulfonate-enriched phase from which the sulfonate in a more concentrated form can be recovered readily.

The amount of the nickel sulfonate composition (including both oil-soluble and water-soluble sulfonates) that can be incorporated into the polymer for the purpose of providing UV stability is about 0.01 to 20% based on a combined weight of the sulfonate and polyolefin. The metal sulfonate salts can be uniformly incorporated into the polyolefin by compounding polyolefin in a molten state with the salt in a suitable mixing device such as a Banbury mill, extruder or the like.

Usually the color of oil-soluble sulfonates which are marketed primarily for use as lube oil additives is very dark. A variety of purification methods exist for decolorizing the oil-soluble sulfonic acids or sulfonates. For example, in one purification method the oil-soluble sulfonic acid is treated with charcoal or clay prior to neutralization. In another method, the oil-soluble sulfonic acid is extracted with a lower alcohol (e.g. methanol) followed by neutralization. None of these are necessary in the present invention. As a matter of fact, it is possible to produce light-colored nickel sulfonate salts from any of the oil-soluble sulfonic acids described herein.

A typical sulfonation technique is described as follows. The desired hydrocarbon or mixture of hydrocarbons was added to a suitable reaction vessel. While stirring the hydrocarbon vigorously, 1.2 volumes of oleum, per volume of hydrocarbon, were added in a manner that the temperature of the reaction mass did not exceed 55° C. After the addition of the oleum, the sulfonation mass was mixed for one hour at 50°–55° C. Then 0.7 volume of water, per volume of hydrocarbon, was added to the sulfonation mass while maintaining the temperature at 55° C. or less. The resulting admixture was placed in a 50° C. oven overnight for phase separation. The inorganic acid phase was removed leaving the desired sulfonic acid.

The general technique for forming and recovering the nickel salts is as follows. To a suitable vessel were added the sulfonic acid and an excess quantity of alcohol (isopropanol, methanol or methoxy ethanol). The sulfonic acid was then neutralized by the addition of a stoichiometric quantity of nickel carbonate or nickel alcoholate (nickel methanolate or nickel methoxy ethanolate). After the neutralization the unreacted nickel carbonate or nickel alcoholate was removed by filtration. A major portion of the solvent was removed by distillation to a bottoms temperature of 110°–120° C. The mixture was then transferred to a vacuum oven and the remaining solvent removed at 100°–110° C. under moderate vacuum.

Although it is preferred to use stoichiometric quantities, excess molar proportions of nickel salts such as nickel carbonate can be used such as 1 to 10 moles of inorganic nickel salt per mole of sulfonic acid, both being expressed as mole equivalent units to each other. The alcohol is generally $C_1$ to $C_{20}$ alkanol and is used preferably in about 1 to 1 to 1 to 0.1 quantities based on sulfonic acid.

The quantity of nickel salt of arylsulphonic acid to be added to the UV sensitive material can vary over wide concentrations depending on the particular polymer, the degree of resistance desired, the presence of other UV light stabilizers which act either additively or synergistically with the nickel salt of the arylsulfonic acid and the molecular weight of the organic moiety portion of the organic sulfonic acid.

Thus, the amount of additive to be used might have to be on a weight basis, might have to be doubled or tripled as the organic moiety increases in molecular weight while the number of moles of nickel remain the same. For instance, for nickel dodecylbenzene sulfonate, one particular weight quantity might be very satisfactory, but if the alkyl group is very long or if there are numerous alkyl groups on the aryl nucleus, then greater quantity portions might be needed.

Taking into account these considerations, it can be said generally, that the novel composition of the invention will contain from about 0.01 to 20, preferably 0.1 to 5, and most preferably 0.1 to 3 weight percent of the nickel salt of the arylsulfonic acid.

Examples of polyolefins which can be benefitted by the presence of the additive include both plastic and elastomeric versions of low or high density polyethylene, polypropylene, polybutene-1, poly-3-methylbutene-1, poly-4-methylpentene-1, copolymers of monoolefins with other olefins (monoor diolefins), or vinyl monomers such as ethylenepropylene comonomer or with one or more additional monomers, i.e., EPDM, ethylene/butylene copolymer, ethylene/vinyl acetate copolymer, and the like.

The term "copolymer" includes two or more monomer constituents and substituted derivatives thereof.

It is to be emphasized that although the description and the examples are primarily directed to polyolefins, e.g., polypropylene, the invention is intended to encompass blends of the nickel arylsulfonic acid salt with other ultraviolet light sensitive polymers such as polystyrene and ABS. The arylsulfonic acid nickel salts can also be used to stabilize polyvinyl chloride, polyesters, cellulosics, polycarbonates, acrylics and even in surface coatings such as furniture lacquers, spar varnishes, tongue oil, phenolics, alkyds, cellulose acetate butyrate polyurethanes, and most of the other coating vehicles.

As examples of the other stabilizers with which the arylsulfonic acid nickel salts of the invention can be used are benzophenones, benzotriazoles, substituted acrylates, arylesters, other compound pigments such as carbon black, titanium oxide and other similar type stabilizers.

The invention will be more fully understood from the following examples.

EXAMPLE 1

A mixture of dodecylbenzene sulfonic acid (130 g., Enjay HCP, 1% sulfuric acid impurity) and nickel carbonate (52 g., Baker, reagent grade) in methanol (1,000 ml) was refluxed overnight. The mixture was cooled and filtered to remove the excess nickel carbonate. The methanol was removed from the filtrate under vacuum leaving 140 g. of a green solid residue. The analysis is summarized as follows: 100% yield, calculated Ni — 7.68%, Found Ni — 7.66%.

In the same nanner the nickel salt of dodecylorthoxylene sulfonic acid was prepared. The analysis was as follows: Yield 100%, calculated Ni — 7.40%, Found 7.01%. On melting, the green nickel salts turned a pale yellow. The green color did not reappear until the salts were contacted with moisture. It would appear that the hydrated form of these salts is green while the dehydrated form is yellow.

EXAMPLE 2

Both nickel salts were tested for their UV stabilizing effectiveness. The salts were compounded into a series of compositions with antioxidant packages A and B which consisted of blends of commercial antioxidants incorporated into fiber grade polypropylene and spun into 6-mil monofilament. Xenon Weatherometer data was obtained on compositions containing both nickel salts as UV stabilizers. For comparison purposes several other commercial UV stabilizers were tested in the Xenon Weatherometer and the results are included in Table I.

Although both nickel salts are a dark green, the monofilament showed, if anything, only a very slight yellow color. There was no tendency for greying and, in general, the color of the monofilament would be acceptable in color critical applications. Apparently the nickel salts are dehydrated on extrusion and remain that way.

The results of the preceding examples are summarized in Table I as follows:

improve their dyeability and also to improve the wettability of films and fibers because of the sulfonates surfactant activity, these properties are also obtained with the nickel arylsulfonates if added in sufficient quantities. There are usually quantities beyond that with which one would find just UV effectiveness, i.e. about 10 to 25 weight percent, preferably 10 to 25 weight percent, and most preferably 10 to 12 weight percent.

In the above examples, the additives were blended into polypropylene powder and compounded in a Brabender pelletizing extruder. The compounded samples were then extruded into 6 mil monofilaments. The sta-

TABLE I

Nickel Sulfonate Systems

| Composition No. | % Other | % DBSN[a] | % OXSN[b] | Oven Days 115°C | Xenon Weatherometer — Hrs. % Retention of Tenacity | | | | | Hrs. to 50% Retention of Tenacity | Outdoor Florida (months) % Retention of Tenacity | | | | |
|---|---|---|---|---|---|---|---|---|---|---|---|---|---|---|---|
| | | | | | 250 | 500 | 750 | 1000 | 1500 | | 4 | 5 | 6 | 8 | 10 |
| Antioxidant A | | | | | | | | | | | | | | | |
| 1 | — | 0.25 | | 39 | 100 | 89 | 66 | 0 | | 825 | 95 | 85 | 88 | 54 | 14 |
| 2 | — | 0.50 | | 39 | 100 | 89 | 70 | 0 | | 850 | 97 | 95 | 86 | 81 | 38 |
| 3 | — | 1.00 | | 39 | 100 | 82 | 54 | 0 | | 725 | 86 | 83 | 68 | 37 | 0 |
| 4 | — | | 0.25 | 48 | 100 | 86 | 53 | 22 | 0 | 775 | 90 | 91 | 79 | 48 | 0 |
| 5 | — | | 0.50 | 45 | 100 | 88 | 67 | 0 | | 825 | 91 | 98 | 91 | 80 | 43 |
| Antioxidant B | | | | | | | | | | | | | | | |
| 6 | — | 0.25 | | 31 | 99 | 59 | 0 | | | 550 | 85 | 67 | 45 | 15 | 0 |
| 7 | — | 0.50 | | 39 | 100 | 83 | 0 | | | 600 | 83 | 73 | 44 | 17 | 0 |
| 8 | — | 0.75 | | 31 | 98 | 75 | 0 | | | 600 | 78 | 65 | 43 | 12 | 0 |
| 9 | — | 1.00 | | 24 | 97 | 45 | 0 | | | 475 | 47 | 28 | 0 | | |
| 10 | — | | 0.25 | 31 | 94 | 56 | 0 | | | 550 | 85 | 71 | 54 | 23 | 0 |
| 11 | — | | 0.50 | 39 | 100 | 82 | 0 | | | 600 | 94 | 83 | 86 | 44 | 0 |
| 12 | — | | 0.75 | 31 | 100 | 78 | 44 | 0 | | 700 | 89 | 81 | 80 | 46 | 17 |
| 13 | — | | 1.00 | 24 | 93 | 81 | 0 | | | 600 | 84 | 74 | 57 | 29 | 0 |
| Antioxidant A | | | | | | | | | | | | | | | |
| 14 | — | | | 24 | 84 | 48 | 0 | | | 475 | 55 | 39 | 0 | | |
| 15 | 0.25 UV531[c] | | | 30 | 99 | 90 | 57 | 0 | | 775 | 89 | 81 | 72 | 48 | 30 |
| 16 | 0.50 Nickel Stearate | | | 72 | 78 | 73 | 57 | 0 | | 775 | 88 92 | 87 80 | 76 79 | 41 54 | 25 36 |
| 17 | 0.25 CHA 1049[c] | | | 39 | 100 | 100 | 77 | 72 | 0 | 1,150 | 77 | 54 | 35 | 0 | |
| 18 | 0.25 UV 1084[c] | | | 66 | 89 | 71 | 49 | 18 | 0 | 750 | | | | | |

[a] Nickel dodecylbenzene sulfonate.
[b] Nickel dodecylorthoxylene sulfonate.
[c] Commercial UV stabilizers.

As can be seen from the above table, the compositions containing either the dodecylbenzene species or the dodecylorthoxylene species of arylsulfonate nickel salt performed extremely well in the Xenon Weatherometer test.

As can be seen for the above Table I, the additives of the invention performed over a wide concentration range extremely effectively in terms of retention of tenacity for a considerable period of time.

This is with respect to both commercial antioxidant system "A" and commercial antioxidant system "B."

As can also be seen, the third category indicates the performance of conventional ultraviolet stabilizers in the presence of antioxidant "A." It is apparent that in this system the results obtained with the nickel arylsulfonates are comparable to the results obtained with conventional UV531, nickel stearate and UV1084. The only commercial additive which seems to be noticeably better is that of CHA 1049. Of course, this has a major color problem which is avoided by the use of the sulfonates of the invention.

Since sulfonate salts have been added to polymers to bilized monofilament samples were then exposed in an Atlas 6000 Watt Xenon-Arc Weather-Ometer Type W operated in accordance with ASTM D-2565-70 test procedures. Periodically, exposed test samples were withdrawn and the percent retention of their original tenacity determined using an Instron operated at a 10 in./min. cross-head speed.

In the above examples, the additives were dry blended into polypropylene powder and compounded in a Brabender pelletizing extruder. The compounded samples were then extruded into 6 mil monofilaments. The stabilized monofilament samples were then exposed in an Atlas 6,000 Watt Xenon-Arc Weather-Ometer Type W operated in accordanace with ASTM D-2565-70 test procedures. Periodically, exposed test samples were withdrawn and the percent retention of their original tenacity determined using an Instron operated at a 10 in./min. cross-head speed The compounded samples were also tested for actual outdoor sunlight resistance in Florida. The results, as can be seen above, were quite satisfactory.

I claim:

1. A substantially white polymer composition exhibiting outstanding resistance to ultraviolet degradation which comprises in combination:
   a major portion of an ultraviolet-sensitive polymer;
   at least one antioxidant stabilizer system for said polymer; and,
   sufficient colorless, light green or pale yellow nickel aryl sulfonate, to measurably retard the ultraviolet sensitivity of said polymer wherein said sulfonate has from one to ten aryl groups, one to ten aliphatic substituents on said aryls, said aliphatic substituents having a total of from one to one hundred carbon atoms.

2. A composition according to claim 1 wherein said composition also contains as a co-stabilizer an ultraviolet stabilizer.

3. A composition according to claim 1 wherein said polymer is a thermoplastic or elastomeric polymer.

4. A composition according to claim 3 wherein said polymer is polyolefin.

5. A composition according to claim 1 wherein said polymer is a surface coating composition.

6. A composition according to claim 1 wherein said polymer is selected from the group of plastics consisting of: acrylonitrile-butadiene-styrene terpolymer, polycarbonate, polyvinylchloride, polyester and cellulosic.

7. A composition according to claim 3 wherein said polymer is polypropylene.

8. A composition according to claim 1 wherein said polymer contains 0.01 to 20 weight percent of said nickel sulfonate.

9. A composition according to claim 8 wherein said sulfonate is a nickel dodecylbenzene sulfonate or a nickel ldodecylorthoxylene sulfonate.

10. A composition according to claim 1 which is a filament.

11. A composition according to claim 2 which is a filament.

12. A composition according to claim 11 which is a polyolefin.

13. A composition according to claim 12 which is polypropylene.

* * * * *